Patented Sept. 11, 1951

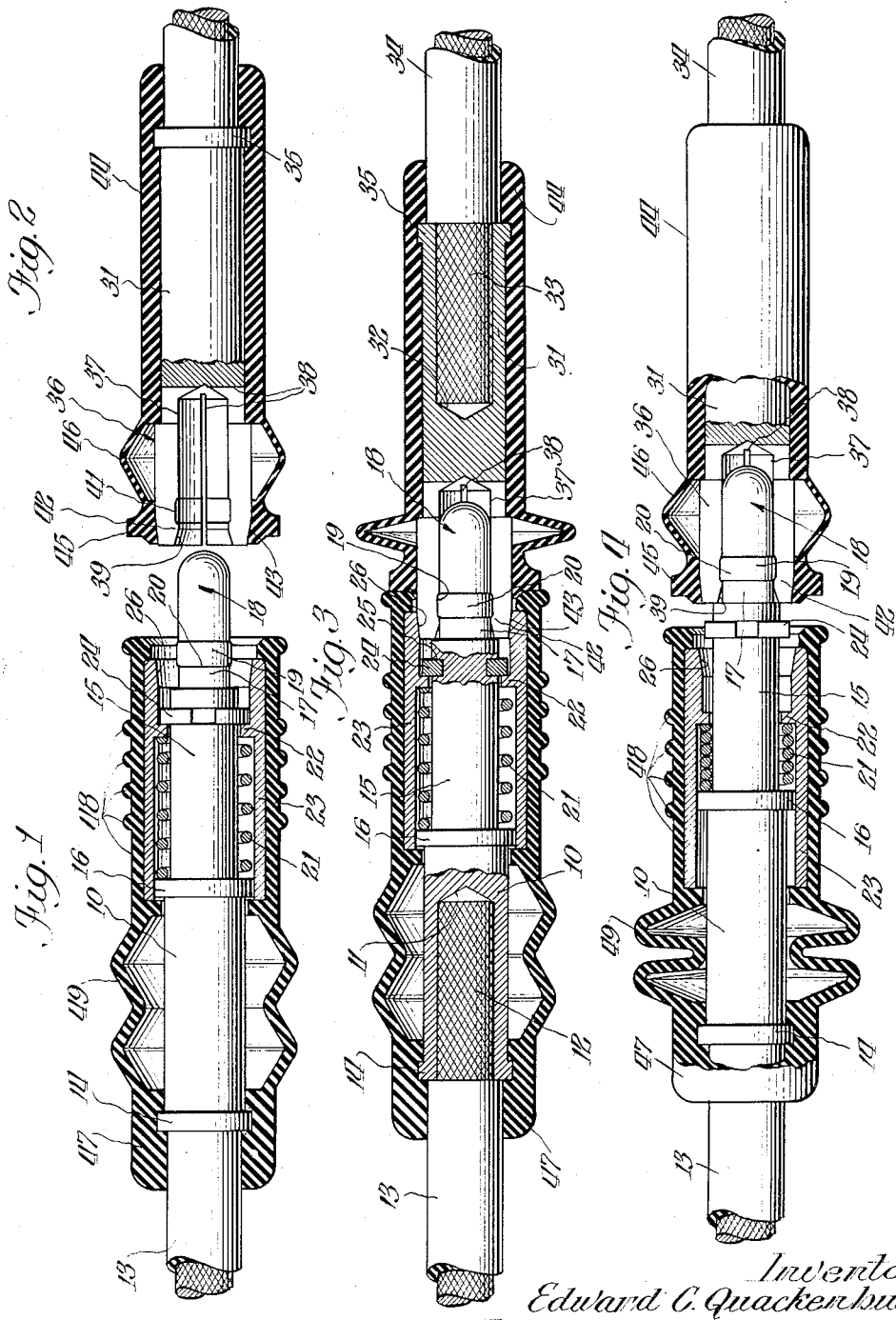

2,567,727

UNITED STATES PATENT OFFICE 2,567,727

CONNECTOR HAVING AN AUTOMATIC LOCKING SLEEVE

Edward C. Quackenbush, Aurora, Ill., assignor to American Phenolic Corporation, Chicago, Ill., a corporation of Illinois Application April 7, 1949, Serial No. 86,082

5 Claims. (Cl. 173—363)

The present invention relates to connectors and couplings, and particularly to electrical connectors of the "quick release" type. It is the general aim of the invention to provide a coupling so designed and constructed that the interconnecting parts of the coupling may be locked together in a positive manner, yet are capable of instant manual release.

The development of satisfactory coupling devices has many aspects, but the problems to be overcome in designing a successful device are particularly troublesome in the electrical arts. This is primarily by reason of the fact that, in dealing with electrical cables, it is not enough to establish a secure mechanical connection between the coupling fittings; it is equally necessary to provide a positive electrical connection of low resistance and capable of carrying a heavy electrical load.

In certain applications, as in the power and control circuits of some naval vessels, for example, it is essential to provide connectors adapted to uniting heavy insulated wires or cables, and capable of withstanding severe mechanical strains and carrying several hundred amperes of electrical current, yet capable of instant release. Certain expedients have heretofore been devised for this purpose, but so far as known these have not entirely solved the problems involved; either for the reason that they cannot withstand great mechanical strains or because they are hooked together so that they can be joined or separated only by a rather complex twisting or rotating motion that cannot be accomplished when the cables are taut.

It is therefore the primary object of the present invention to provide a quick release coupling for electrical conductors wherein the conductors will normally be positively locked together, yet may be instantly released by a quick and easy manual movement.

A further object of the invention is to provide a coupling as above wherein the mating parts of the coupling are so arranged as to automatically lock to each other when they are brought together, even without the necessity of touching the couplings. Thus the usual stiff cables used for power circuits may be joined by grasping the opposite cables on a point well back on their insulation.

A further object of the invention is to provide a coupling wherein the mating parts are locked to each other by a straight line movement toward each other, so that connections may be conveniently made in crowded quarters or in close proximity to other wires.

A still further object is to provide a quick releasing coupling arranged to withstand severe mechanical strain, yet to be easily released by a straight outward pull on one of the connector fittings; so that the device may be easily and naturally operated without any skill or training in its use, even by persons having no understanding of the principles by which it functions.

A further important object of the invention is to provide a quick disconnecting coupling capable of carrying a substantial mechanical load, wherein the parts may be brought together and locked without the need of slack or looseness in the cables, and may be released by a simple manual movement, even when the cables joined by the coupling are under tension.

Still another object of the invention is the provision of a coupling having the functional characteristics outlined above yet consisting of a relatively few coacting parts, all of which are of strong, simple and rugged design, so that the device is economical to manufacture, yet is capable of withstanding long use, rough treatment, abuse and neglect without impairing its operational characteristics.

The foregoing objects are accomplished according to these teachings by the provision of a simple receptacle and plug so arranged as to automatically lock to each other when the plug is inserted. The operation is entirely automatic. In fact, it is unnecessary to touch either part of the connector to join a pair of cables, and if desired, the couplings may be fastened by grasping the cables themselves, rather than the coupling fittings.

A present commercial form of the connector chosen as best illustrative of the principles of the invention is illustrated in the drawings of this specification wherein:

Figure 1 is a longitudinal sectional view of a connector plug as here contemplated;

Figure 2 is a longitudinal sectional view of the receptacle portion of the connector;

Figure 3 is a longitudinal sectional view of the connector assembly shown in locked position; and Figure 4 is a longitudinal sectional view similar to Figure 3 showing an intermediate position that the parts assume as the connector is being released.

The connector plug has a body portion 10 with a bore 11 to receive the end of a cable 12. The cable shown consists of a stranded conductor having a layer of insulation 13. This insulation is stripped from the end portion of the conductor, which is soldered or crimped into the bore 11. As shown, the plug body has an end flange 14. The plug body has a neck portion 15 extending from a flange 16 to the base 17 of a contact pin 18. The pin 18 has a detent consisting of an enlarged annular band 19 having a locking shoulder 20 at a point near the base of the pin. The neck portion of the plug carries a coiled compression spring 21 which extends between the flange 16 of the plug and an internal flange 22 of a locking sleeve 23. This sleeve is slidably mounted with respect to the plug and is held in assembled relation by a split retaining ring 24 clamped into an annular groove 25 in the forward end of the neck portion 15. The forward extremity 26 of the locking sleeve 23 overhangs the base 17 of the contact pin and at the limit of its movement lies at a point close to the annular detent shoulder 20 of the pin. The inner surface of the sleeve may be slightly tapered at the forward extremity, if desired.

The receptacle of the connector consists of a body portion 31 having a bore 32 to receive the stranded conductor of a cable 33, which ordinarily has an insulating layer 34. If desired, the rearmost end of the receptacle body 31 may be flanged as at 35. The forward end of the receptacle body includes an enlarged head generally designated as 36 formed with a cylindrical bore 37 and slotted at 38, so that the head comprises a multiple jaw collet. The bore 37 is preferably provided with a slight taper at its mouth 39, and is undercut at 41 to define a detent shoulder 42 adapted to engage and interlock with the detent shoulder 20 of the plug. The outer surface 43 of the collet jaws is of a diameter to be received within the forward end of the locking sleeve 23 and may be provided with a slight taper corresponding to the taper of the locking sleeve, if desired.

The plug and receptacle of the connector may be used without insulation, if desired, but in the drawings they are shown as being provided with a yieldable resilient insulating sleeve 44 joined to a ring portion 45 around the collet jaws by the yieldable joint 46. Similarly the plug is shown as provided with a rubber sleeve 47 joined to a ribbed hand grip portion 48 on the sleeve 23 by a flexible extension portion 49.

The connector may be engaged and locked by the single manual movement of inserting the plug straight into the receptacle. This may be done by grasping the rubber sleeve 47 or plug body 10, or by grasping the insulation 13 of the cable. As the pin 18 enters the bore 37 of the receptacle it slides into wiping contact with the inner surfaces of the bore and establishes an intimate electrical union between the parts. As the annular shoulder 20 enters the tapered mouth 39 of the collet, the jaws spread momentarily as the band 19 passes the shoulders 42 and seats in the undercut 41. The inward movement of the plug assembly causes the forward end 26 of the locking sleeve 23 to engage the ends of the collet jaws, but the jaws have been spread before these parts touch, with the result that the forward motion of the locking sleeve, which is urged forward only by the relatively light coil spring 21, is arrested until the pin 18 has penetrated its full depth into the bore 37 and the band 19 has seated in the undercut 41. As this occurs the inherent resiliency of the jaws of the collet cause it to contract, whereupon the spring 21 snaps the locking sleeve 23 forward, so that it encircles the tapered end of the collet jaws in the manner illustrated in Figure 3. The connector is now positively locked against release. That is, the pin 18 is held within the jaws of the collet by the interengagement of the shoulders 20 and 42, and the collet cannot expand to release these detent shoulders from each other because it is locked by the forward end 26 of the sleeve 23.

To release the coupling it is only necessary to grasp the plug by the sleeve 23 (or the ribbed insulated sleeve 48 surrounding it) and pull the receptacle and plug apart. The first action occurring when this is done is illustrated in Figure 4 where it will be seen that the sleeve 23 moves outwardly against the light tension of the spring 21 until the spring is completely compressed between the shoulders 22 and 16. This causes the forward end 26 of the sleeve to release the jaws of the collet. The collet now is free to expand, so that continued outward movement of the sleeve will cause the shoulder 20 of the pin to exert a camming action on the shoulder 42 of the collet, spreading the collet jaws sufficiently to release the pin.

From the foregoing it will be seen that a coupling according to these teachings accomplishes important practical advantages over prior devices in several respects. In the first place, it is simple mechanically. It nevertheless establishes an efficient electrical as well as mechanical connection between the cables with which it is used. The electrical current path extends through only two parts of the connector, and these have coacting cylindrical wiping contact surfaces which provide the most efficient electrical connection possible. Mechanically, the strength of the coupling may be made to exceed the strength of the cables.

The couplings according to these teachings may be conveniently used, even by persons entirely unfamiliar with their internal structure or principle of operation, since they need only be thrust together to interlock and will release in response to a direct outward pull on the hand grip of the plug. The parts are united and separated by a single, straight, inward or outward movement. It follows that the connectors are particularly convenient for use where space is limited or in the proximity of other wiring, where the necessity of bringing the opposite halves of the connector together at an angle to each other may constitute a serious disadvantage from a practical standpoint. It is quite unnecessary to have any looseness or slack in the conductors, either in coupling the parts or to release them, since the parts move together in a straight line and lock to each other at the extreme limit of their movement. Similarly, the coupling may be released in exactly the same manner irrespective of whether the cables joined by it are loose or taut.

It is to be noted that a coupling according to the present teachings eliminates any tendency for twisting of the cables with which it is used. The plug and receptacle are circular in cross section, and therefore, may be brought together in any orientation. In fact, the cables may be twisted relative to each other even when the coupling is engaged, since the coupling will act as a swivel but will nevertheless remain locked.

The form of the invention chosen as illustrative of the inventive principles involved herein is a preferred embodiment of the invention now in commercial manufacture. These teachings are equally advantageous in various modifications of the structure shown, however, and it is accordingly pointed out that the showing of the present specification and drawings is by way of illustration rather than limitation, and that the inventive concept is not to be limited to the precise structure illustrated, but extends equally to any modification or variation thereof within the terms of the appended claims.

Having thus described the invention, what I claim as new and desire to protect by United States Letters Patent is:

1. A quick-disconnecting automatic coupling connector consisting of a receptacle and a plug in telescoping relationship; the plug having recessed body portion, neck and cylindrical contact pin integral with each other, with a detent portion consisting of an annular shoulder integral with the contact pin at a point adjacent the neck portion; a slidable locking sleeve surrounding said body along the neck portion and overhanging the detent portion of the pin, a coil spring encircling the neck of the body and urging the sleeve longitudinally toward the pin, and means to limit the movement of the sleeve; the receptacle consisting of a recessed body portion and a multiple jaw collet integral therewith, with a generally cylindrical bore to receive the contact pin of the plug; a coacting detent portion comprising an annular shoulder within the jaws of the collet to interlock with the detent portion of the plug; said collet having exterior surfaces engaged by the forward end of the locking sleeve of the plug whereby the sleeve restrains the collet against expansion and holds the plug and receptacle detents locked together.

2. A quick-disconnecting automatic coupling connector consisting of a receptacle and a plug in telescoping relationship, the plug having a cylindrical contact pin with a detent portion consisting of an annular shoulder integral with the pin, a slidable locking sleeve surrounding said pin, and a spring urging the sleeve longitudinally of the pin, and means to limit the relative movement between the sleeve and pin, the receptacle consisting of a multiple jaw collet having a generally cylindrical bore to receive the contact pin of the plug, with a coacting detent portion of the plug; said collet having exterior surfaces engaged by the forward end of the locking sleeve of the plug whereby the sleeve restrains the collet against expansion and holds the plug and receptacle detents locked together.

3. A quick-disconnecting automatic coupling connector consisting of a receptacle and a plug in telescoping relationship, the plug having a cylindrical contact pin with a detent portion consisting of an annular shoulder integral with the pin, a slidable locking sleeve surrounding said pin, and a spring urging the sleeve longitudinally of the pin; the receptacle consisting of a multiple jaw collet having a generally cylindrical bore to receive the contact pin of the plug, with a coacting detent portion comprising an annular shoulder to interlock with the detent portion of the plug; said collet having exterior surfaces engaged by the forward end of the locking sleeve of the plug whereby the sleeve restrains the collet against expansion and holds the plug and receptacle detents locked together.

4. A quick-disconnecting automatic coupling connector comprising a receptacle and a plug in telescoping relationship; the plug having a laterally extending detent portion and the receptacle having an internal bore to receive the plug, with a coacting detent portion comprising a shoulder to interlock with the detent portion of the plug; a slidable locking sleeve surrounding said plug; a coil spring urging the sleeve longitudinally of the plug; exterior surfaces on the receptacle to enter the forward end of the locking sleeve of the plug whereby the sleeve holds the plug and receptacle detents locked together.

5. A quick-disconnecting automatic coupling connector comprising a receptacle and a plug in telescoping relationship; the plug having a laterally extending detent portion consisting of an annular shoulder and the receptacle having an internal bore to receive the plug, with a coacting detent to interlock with the detent portion of the plug; a slidable locking sleeve surrounding said plug; a coil spring urging the sleeve longitudinally of the plug; exterior surfaces on the receptacle to enter the forward end of the locking sleeve of the plug whereby the sleeve holds the plug and receptacle detents locked together.

EDWARD C. QUACKENBUSH.

REFERENCES CITED

The following references are of record in the file of this patent:

UNITED STATES PATENTS

| Number | Name | Date |
|---|---|---|
| 1,667,485 | Macdonald | Apr. 24, 1928 |
| 1,677,734 | Smith | July 17, 1928 |
| 2,136,848 | Hassler | Nov. 15, 1938 |
| 2,441,393 | Buchanan et al. | May 11, 1948 |
| 2,518,542 | Hansen | Aug. 15, 1950 |

FOREIGN PATENTS

| Number | Country | Date |
|---|---|---|
| 771,521 | France | Oct. 10, 1934 |